United States Patent Office 3,327,905
Patented June 27, 1967

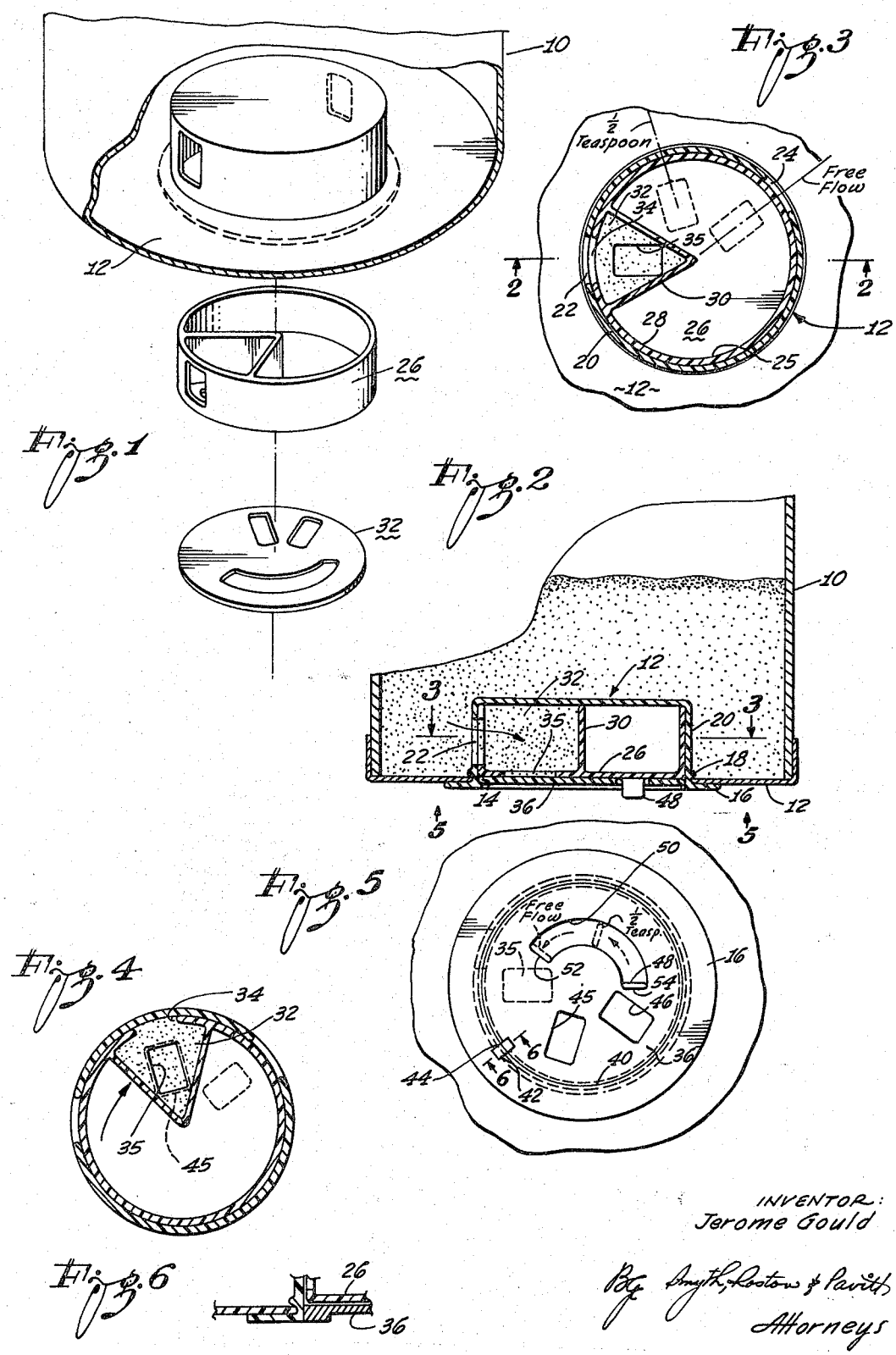

3,327,905
MEASURING AND DISPENSING CONTAINER
Jerome Gould, Encino, Calif., assignor to Design Properties, Inc., Los Angeles, Calif., a corporation of California
Filed Oct. 20, 1965, Ser. No. 498,234
11 Claims. (Cl. 222—331)

This invention relates to a dispensing container for powdered or granular materials and, more particularly, relates to a dispensing container which may be turned to a given position and manipulated in a simple manner to release a predetermined quantity of the material.

The general type of dispensing container to which the invention pertains has a dispensing compartment which is manually rotated from a first loading position to a second dispensing position, the compartment being open to the interior of the container at the first position and being open to the exterior of the container at the second position. In a typical prior art construction, the dispensing compartment is part of a rotary dispensing member which is nested into a fixed circular chamber. A predetermined quantity of material that is to be dispensed simply drops from the interior of the container into the measuring compartment at the first rotary position of the dispensing member and subsequently at a second rotary position drops out of the measuring compartment.

A certain problem arises from the fact that it is desirable to make the dispensing mechanism of smaller diameter than the container and to locate the dispensing mechanism entirely within the confines of the container instead of having the dispensing mechanism protrude from the container. A protruding dispensing unit is vulnerable to damage by impact and not only increases the overall axial dimension of the container but also interferes with stacking of the containers. Unfortunately, however, if the usual rotary dispensing unit is of smaller diameter than the container itself and is mounted inside the end wall of the container, the inlet port in the inner end wall of the dispensing unit is spaced inwardly from the end wall of the container by the axial dimension of the dispensing unit and the container cannot be completely emptied because a substantial residual quantity of the material is invariably trapped around the periphery of the dispensing unit.

The present invention solves this problem by changing the location of the inlet port of the dispensing unit to the peripheral or circumferential wall of the fixed chamber in which the measuring or dispensing compartment rotates. Thus the granular material flows into the measuring compartment from one side of the compartment instead of dropping into the measuring compartment from above. At first thought it would seem that the material flowing into the measuring compartment from one side would not completely fill the compartment and therefore would not be accurately measured. It has been found, however, that accurate allowance can be made for the void in the measuring compartment since the void is created by a definite angle of repose of the angular material in the measuring compartment.

A primary problem in the design of a container of this type is to provide a dispensing structure that may be mass produced at sufficiently low cost for commercial acceptance. Containers for dry flowable material such as salt and sugar are made of inexpensive cardboard and are fabricated at low cost by automatic machinery. Various dispensing containers of the present type have been devised heretofore, but, in general, the structure of such containers has been complicated and entirely unsuited for low mass production.

The present invention meets this basic problem by providing an internal dispensing unit which is designed for mass production as a separate item and which may be readily assembled to a conventional container at exceedingly low cost. Thus the invention avoids adding cost-raising complications to the construction of the container itself.

Given the concept of manufacturing an internal dispensing unit separate from the container, two problems are encountered. One of these problems is to design the dispensing unit per se for low cost mass production. The other problem is to design the dispensing unit for quick and simple installation in the container.

The present invention solves these last two problems by providing a dispensing unit that comprises simple, molded plastic parts which are designed for simple and rapid assembly. The fixed circular chamber is formed by a cup-shaped plastic member that is simply snapped into engagement with the rim of a circular opening in the cardboard end wall of the container. A rotary dispensing member that provides the measuring compartment simply telescopes into the cup-shaped member and is confined therein by a disk that snaps into engagement with the cup-shaped member.

The features and advantages of the invention may be understood from the following detailed description and the accompanying drawing.

In the drawing, which is to be regarded as merely illustrative:

FIG. 1 is a perspective exploded view of the parts of the dispensing unit;

FIG. 2 is a transverse section through the dispensing unit taken as indicated by the line 2—2 of FIG. 3;

FIG. 3 is a transverse section through the dispensing unit taken as indicated by the line 3—3 of FIG. 2 showing the dispensing or measuring compartment at its loading position;

FIG. 4 is a view similar to FIG. 3 showing the measuring compartment at a second position for dispensing a measured quantity of the material;

FIG. 5 is a bottom plan view of the dispensing unit as viewed along the line 5—5 of FIG. 2; and FIG. 6 is an enlarged fragmentary section along the line 6—6 of FIG. 5.

The drawing shows the invention incorporated in a cardboard container, such as a container for salt, the container having a cylindrical body 10 and an end wall 12. When the container is used to dispense a major quantity of the granular material, for example ½ teaspoonful, the container is positioned with the end wall 12 at the bottom of the container. For the purpose of the invention the end wall 12 is formed with a circular opening with a rim 14, the diameter of the circular opening being substantially smaller than the diameter of the container.

The previously mentioned fixed chamber of the dispensing unit is an inverted cup-shaped member 15 made of suitable plastic material and formed with a radial rim flange 16 which abuts the outer surface of the end wall 12 around the rim 14 of the circular opening. The cup-shaped member 15 is further formed with a circumferential bead or rib 18 which cooperates with the rim flange 16 to form a groove in which the rim 14 of the end wall 12 is seated. It is contemplated that the cup-shaped member 15 will be resiliently deformable to permit it to snap into engagement with the rim 14 of the end wall 12. The cup-shaped member 15 has a cylindrical peripheral wall 20 which is formed with a first inlet port 22 and a second inlet port 24 which is spaced substantially from the first inlet port around the circumference of the peripheral wall.

A dispensing member, generally designated 25, of circular configuration is rotatably nested in the cup-shaped member 15 to rotate through a range of three positions, namely, a first loading position to receive material from the interior of the container, a first dispensing position to dispense a predetermined or measured quantity of the granular material and a second dispensing position at which the dispensing member places the second inlet port 24 of the cup-shaped member in communication with the exterior of the container for continuous discharge of the granular material.

The dispensing member 25 has a bottom wall 26, a cylindrical peripheral wall 28, and an angular wall 30 which forms an eccentrically positioned dispensing or measuring compartment 32. The measuring compartment 32 has an inlet port 34 which registers with the inlet port 22 of the cup-shaped member 12 at the first or loading position of the dispensing member. In addition the dispensing compartment 32 has an outlet port 35 in the bottom wall 26 of the dispensing member.

The rotary dispensing member 25 is confined in the cup-shaped member 12 by means of a plastic disk 36 which, in effect, forms a portion of the end wall 12 of the container. In the construction shown the plastic disk 36 is held in its assembled position by an inner circumferential shoulder of the cup-shaped member 12 which inner circumferential shoulder is formed by an inner circumferential bead or rib 40. By virtue of this construction, the plastic disk 36 may be snapped into engagement with the cup-shaped member in the procedure of assembling the container. It is essential that the plastic disk 36 be assembled at a predetermined orientation and for this purpose the plastic disk may be formed with a peripheral lug 42 shown in FIGS. 4 and 5 which lug seats in a complementary notch or gap 44 in the bead or rib 40.

The plastic disk 36 is formed with a first dispensing port 45 and a second dispensing port 46, the outlet port 35 of the measuring compartment 32 registering with the first dispensing port at the first dispensing position of the dispensing member and the outlet port registering with the second dispensing port 46 at the second dispensing position of the dispensing member. At the second dispensing position of the dispensing member where the outlet port 35 of the measuring compartment 32 registers with the second dispensing port 46, the inlet port 34 of the measuring compartment registers with the second inlet port 24 of the cup-shaped member 15 so that the granular material may pour freely from the interior of the container through the measuring compartment 32 to the exterior of the container.

It is contemplated that an integral portion of the dispensing member 25 will extend through the plastic disk 36 to serve as means for manual rotation of the dispensing member. For example, the dispensing member 25 may be formed with an eccentrically positioned integral tab or finger piece 48 which extends through an arcuate aperture 50 in the disk 36. When the finger piece 48 is at one end 52 of the arcuate aperture 50, as indicated in dotted lines in FIG. 5, the measuring compartment 32 is at its loading position with its inlet port 22 of the cup-shaped member as shown in FIG. 3. When the finger piece 48 is at an intermediate position which is also indicated in dotted lines in FIG. 5, the measuring compartment 32 is at its first dispensing position shown in FIG. 4 where its outlet port 35 registers with the first dispensing port 45 of the disk 36. When the finger piece 48 is at its second limit position against the second end 54 of the arcuate aperture 50, as shown in solid lines in FIG. 5, the inlet port 34 of the measuring compartment 32 registers with the second inlet port 24 of the cup-shaped member and at the same time the outlet port 35 of the measuring compartment registers with the second dispensing port 46 of the disk 36 to permit material to flow continuously from the interior of the container through the measuring compartment to the exterior of the container.

My description in specific detail of the selected embodiment of the invention will suggest various changes, substitutions and other departures from my disclosure within the spirit and scope of the appended claims.

I claim:
1. In a dispensing container having a bottom wall, the combination of:
   a fixed circular chamber having a peripheral wall inside the container and having an end wall contacting said bottom wall and exposed to the exterior of the container,
   said peripheral wall having an inlet port and said end wall having a dispensing port spaced in a circumferential direction from the inlet port; and
   a circular dispensing member manually rotatable in said chamber, said dispensing member having an eccentrically positioned dispensing compartment to move in an arcuate path from a loading position at said inlet port of the chamber to a dispensing position at said dispensing port of the chamber,
   said compartment having a peripheral inlet port located to register with said inlet port of the chamber at the loading position of the compartment,
   said compartment having an outlet port located for overlapping register with said dispensing port at the dispensing position of the compartment.

2. A combination as set forth in claim 1 in which:
   said end wall of the fixed circular chamber has a second dispensing port spaced in a circumferential direction beyond the first mentioned dispensing port for overlapping registration with the outlet port of the dispensing compartment at a second dispensing position of the dispensing compartment; and
   said peripheral wall of the fixed circular chamber has a second inlet port positioned to register with said inlet port of the compartment at the second dispensing position of the compartment thereby to place the interior of the container in direct communication with said second dispensing port.

3. In a container for granular material, which container has a wall which is the bottom wall of the container at a given position of the container, the combination of:
   wall structure forming with said bottom wall a fixed chamber with a cylindrical peripheral wall inside the container,
   said chamber having an inlet port in said peripheral wall and an eccentrically positioned dispensing port in said bottom wall; and
   a circular dispensing member confined in said chamber concentrically thereof for manual rotation therein from a normal position to a dispensing position,
   said dispensing member having a cylindrical peripheral wall nested in the cylindrical peripheral wall of the chamber, said peripheral wall of the dispensing member having an inlet port to cooperate with the inlet port of the chamber,
   said dispensing member having a bottom wall normally closing said dispensing port of the chamber,
   said dispensing member having walls cooperative with a portion of the peripheral wall of the dispensing member and cooperative with the bottom wall of the dispensing member to form a measuring compartment in communication with the inlet port of the dispensing member,
   said dispensing compartment having an outlet port in said bottom wall of the dispensing member positioned for overlapping register with said dispensing port at the dispensing position of the dispensing member to discharge a predetermined quantity of material from the container.

4. A combination as set forth in claim 3 which includes means extending through said bottom wall of the container from the dispensing member for manipulation to rotate the dispensing member.

5. A combination as set forth in claim 4 in which said operating means extends fixedly from the dispensing member eccentrically thereof through an aperture in the bottom wall of the container,
   at least one edge of the aperture serving as a stop to abut the operating means at one of said positions of the dispensing member.

6. A combination as set forth in claim 3 in which said bottom wall of the container has a circular opening therein;
   in which a member of the configuration of an inverted cup is mounted in said circular opening to form said peripheral wall of the chamber and to form an inner transverse wall of the chamber; and
   in which a fixed disk closes the bottom of the inverted cup member, said disk having said first and second dispensing ports therein.

7. In a container for granular material, which container has a wall that is the bottom wall of the container at a given position of the container, the combination of:
   wall structure forming with said bottom wall a fixed circular chamber inside the container,
   said chamber having a cylindrical peripheral wall with an inlet port therein,
   said chamber having a first dispensing port and a second dispensing port both in said bottom wall of the chamber and spaced radially from the center of the chamber;
   a circular dispensing member confined in said chamber concentrically thereof for manual rotation therein from a normal position to a first dispensing position and from the first dispensing position to a second dispensing position,
   said dispensing member having a cylindrical peripheral wall nested in the cylindrical peripheral wall of the chamber, said peripheral wall of the dispensing member having an inlet port to register with the inlet port of the chamber,
   said dispensing member having a bottom wall normally closing said first and second dispensing ports of the container,
   said dispensing member having walls cooperative with said cylindrical peripheral wall and said bottom wall of the dispensing member to form a measuring compartment in communication with the inlet port of the dispensing member,
   said measuring compartment having a bottom port positioned to register with said first dispensing port of the circular chamber at the first dispensing position of the dispensing member to discharge a predetermined quantity of the material by emptying the measuring compartment and to register with said second dispensing port of the circular chamber at the second dispensing position of the dispensing member to place the second dispensing port in direct communication with the container through the measuring compartment.

8. A rotary measuring and dispensing unit for mounting in an opening in a wall of a container, comprising:
   a cup-shaped plastic member adapted for mounting in said opening, said cup-shaped member having an inlet port to receive material from the interior of the container;
   a dispensing member dimensioned to nest into the cup-shaped member for manual rotation therein, said dispensing member having a measuring compartment eccentrically located to travel in an arcuate path from a normal first position to a second dispensing position; and
   a plastic disk adapted to span the cup-shaped member to retain the dispensing member therein, said disk having therein both a dispensing port and an aperture,
   a portion of said dispensing member being positioned and dimensioned to extend through said aperture for manipulation to rotate the dispensing member,
   said compartment having an inlet port positioned to register with said inlet port of the cup-shaped member at the first rotary position of the dispensing member and having a second outlet port positioned to register with said dispensing port at the dispensing position of the dispensing member.

9. A combination as set forth in claim 8 in which said disk has a second dispensing port to register with the outlet port of the measuring compartment at a third rotary position of the dispensing member, and
   in which said cup-shaped member has a second inlet port positioned to register with said inlet port of the measuring compartment at said third rotary position of the dispensing member to place the second dispensing port in direct communication with the interior of the container.

10. A combination as set forth in claim 8 in which said cup-shaped member is formed with an external circumferential groove for snap engagement with the rim of said opening in the wall of the container.

11. A combination as set forth in claim 8 in which said cup-shaped member has an inner circumferential shoulder for snap engagement with said disk.

References Cited
UNITED STATES PATENTS

| | | | |
|---|---|---|---|
| 637,683 | 11/1899 | Turner | 222—367 X |
| 1,752,720 | 4/1930 | Bergelson | 222—362 X |
| 1,943,199 | 1/1934 | Asplund | 222—367 |
| 2,002,039 | 5/1935 | McPhee | 222—262 X |
| 2,730,272 | 1/1956 | Ellis | 222—362 |
| 3,099,365 | 7/1963 | Johnson | 221—263 |

ROBERT B. REEVES, *Primary Examiner.*

HADD S. LANE, *Examiner.*